(12) United States Patent  
Forey

(10) Patent No.: US 8,160,179 B2
(45) Date of Patent: Apr. 17, 2012

(54) CROSS-OVER COMPENSATION BY SELECTIVE INVERSION

(75) Inventor: Simon Forey, Northampton (GB)

(73) Assignee: Texas Instruments Incorporated, Dallas, TX (US)

( * ) Notice: Subject to any disclaimer, the term of this patent is extended or adjusted under 35 U.S.C. 154(b) by 795 days.

(21) Appl. No.: 12/028,402

(22) Filed: Feb. 8, 2008

(65) Prior Publication Data

US 2008/0192859 A1    Aug. 14, 2008

Related U.S. Application Data

(60) Provisional application No. 61/016,870, filed on Dec. 27, 2007.

(30) Foreign Application Priority Data

Feb. 9, 2007   (GB) .................................. 0702626.3

(51) Int. Cl.
*H03K 9/00*   (2006.01)
(52) U.S. Cl. ......... 375/316; 375/298; 375/296; 375/259
(58) Field of Classification Search .................. 375/316, 375/298, 296, 259
See application file for complete search history.

(56) References Cited

U.S. PATENT DOCUMENTS

| 5,886,919 | A | 3/1999 | Morikawa et al. |
| 6,865,231 | B1 | 3/2005 | Bunton et al. |
| 6,970,516 | B1 | 11/2005 | Schauer et al. |
| 2003/0041082 | A1* | 2/2003 | Dibrino .................. 708/501 |
| 2004/0056785 | A1* | 3/2004 | Webster et al. ............ 341/61 |
| 2005/0030934 | A1* | 2/2005 | Takahira et al. .......... 370/350 |
| 2007/0053419 | A1* | 3/2007 | Park et al. ............... 375/232 |

FOREIGN PATENT DOCUMENTS

| EP | 1511253 A1 | 3/2005 |
| GB | 1538570 A | 1/1979 |
| JP | 2000201074 A | 7/2000 |

OTHER PUBLICATIONS

Payne, "A 6.25 Gb/s Binary Adaptive DFE with First Post-Cursor tap Cancellation for Serial backplane Communications" ISSCC 2005.*
Beukema, "A 6.4 Gb/s CMOS SerDes Core with feed-forward and Decision Feedback Equalization" ISSCC 2005.*
Balan, "A 4.8-6.4 Gb/s serial Link for Backplane Applications Using Decision Feedback Equalization" IEEE JSSC Nov. 2005.*
Kasturia, "Techniques for High-Speed implementation of Non-linear cancellation" IEEE Journal on selected areas in Communications. Jun. 1991.*
Mueller, "Timing recovery in Digital Synchronous Data Receivers" IEEE Transactions on Communications May 1976.*

* cited by examiner

*Primary Examiner* — Juan A Torres
(74) *Attorney, Agent, or Firm* — John R. Pessetto; W. James Brady; Frederick J. Telecky, Jr.

(57) ABSTRACT

A receiver with selective sign inversion which can compensate for cross-over conversion is described. Some inputs may be a differential data inputs; a sign select input; a converter having inputs coupled to the differential data inputs and having first and second outputs, wherein the converter is adapted to convert a differential data signal received at the differential data input into a digital data output at the first output and a sign signal at the second output; and a selective sign inverter having a first input coupled to the sign output of the analogue-to-digital converter, a second input coupled to the sign select input and an output, wherein the signal received at the first input of the selective sign inverter is selectively inverted in dependence on the signal received at the second input in order to provide the modified sign select signal.

10 Claims, 5 Drawing Sheets

CROSS-OVER COMPENSATION BY SELECTIVE INVERSION

This application claims priority under 35 U.S.C. 119(a) to GB Provisional Application No. 0702626.3 filed Feb. 9, 2007.

This application claims priority under 35 U.S.C. 119(e)(1) to U.S. Provisional Application No. 61/016,870 filed Dec. 27, 2007.

BACKGROUND OF THE INVENTION

The present invention relates to cross-over conversion in data transfer applications.

High speed data transfer between semiconductor devices in an electronic system may be achieved by the use of a serialiser/deserialiser (SerDes). In order to avoid the use of a plurality of parallel connections between devices, a single differential analogue path is used running at a high data rate. One exemplary arrangement is specified by IEEE 802.3/AE/P.

In general, the differential signal from a transmitter arrives at an Analogue-Digital converter (ADC) in a receiver. In one exemplary application of the invention, the ADC has thirteen levels and output provides a 3-bit binary output, together with a sign bit.

High speed data transfer techniques such as SerDes operate in data transfer intensive environments, such as super computers and switch or router back planes. Signal routing in such environments is not trivial. Thus, it may not be possible to preserve the physical alignment of the tracks running between devices without recourse to track cross-over. A cross-over may be provided by a through board via or other wiring techniques, but not without a detrimental effect on the transmission channel characteristic and potential lack of symmetry. An alternative would be to wire directly from transmitter to receiver and to deal with the resultant inversion by means of a cross-over switch at either the transmitter output or the receiver input. However, the introduction of such a switch at the high data rates envisaged in the applications of the present invention would be problematic.

SUMMARY OF THE INVENTION

The present invention provides a receiver circuit comprising: a differential data input; a sign select input; an analogue-digital converter having inputs coupled to said differential data inputs and having first and second outputs, wherein said analogue-to-digital converter is adapted to convert a differential data signal received at said differential data input into a digital data output at said first output and a sign signal at said second output; and a selective sign inverter having a first input coupled to the sign output of said analogue-to-digital converter, a second input coupled to said sign select input and an output, wherein said selective sign inverter is adapted to provide a modified sign select signal at said output, wherein the signal received at the first input of said selective sign inverter is selectively inverted in dependence on the signal received at said second input in order to provide said modified sign select signal.

The present invention also provides a method comprising the steps of: receiving a differential data signal at a first input; receiving a sign select input; converting said differential data signal into a magnitude signal and a sign signal; selectively inverting said sign signal in dependence on the sign select input and providing said selectively inverted signal as a sign output; and outputting said magnitude signal and said sign output.

The selective sign inverter of the present invention may be an XOR gate, thereby providing a simple and elegant solution to the problem of data inversion caused by wiring cross-overs.

The digital data output may be in the form of a thermometer code. Further, a thermometer code to gray code converter may be provided for converting said digital data output into a gray code output.

In one form of the invention, the receiver is a SerDes receiver.

In one form of the present invention, the receiver described above forms parts of a transmitter-receiver pair comprising a transmitter having a differential data output and a sign select output and a receiver as described above, wherein the differential data output of said transmitter is coupled to the differential data input of said receiver and the sign select output of said transmitter is coupled to the sign select input of said receiver. The sign select signal provided by said transmitter is indicative of whether or not a wiring cross-over occurs between an output of said transmitter and an input of said receiver.

The present invention also provides a transmitter circuit comprising: a data input comprising a magnitude data input and a sign data input; a sign select input; a selective inverter having a first input coupled to the sign data input, a second input coupled to the sign select input and an output, wherein said selective sign inverter is adapted to provide a modified sign select signal at its output, wherein the signal received at the first input of said selective inverter is inverted in dependence on the signal received at the second input of said selective inverter in order to provide said modified sign select signal; a magnitude/sign to differential converter having a first input coupled to the magnitude data input, a second input coupled to an output of the selective inverter and an output, wherein said magnitude/sign to differential converter is adapted to convert the magnitude data input and the modified sign select data into a differential data signal and to provide said differential data signal at said output; and a differential output coupled to the output of said magnitude/sign to differential converter.

The said transmitter may comprise part of a transmitter-receiver pair. The transmitter can therefore be used with a receiver that does not have the selective inversion capability described above, thereby providing backward compatibility.

The present invention yet further provides a method comprising the steps of: receiving a data input comprising a magnitude data input and a sign data input; receiving a sign select input; selectively inverting said sign data input in dependence on the sign select input and providing said selectively inverted signal as a sign input to a magnitude/sign to differential converter; providing said magnitude data to said magnitude/sign to differential converter; and generating a differential output from said magnitude data and said selectively inverted signal.

BRIEF DESCRIPTION OF THE DRAWINGS

Examples of the invention will now be described with reference to the accompanying drawings, of which.

DETAILED DESCRIPTION OF THE PREFERRED EMBODIMENTS

A key challenge facing designers of high-bandwidth systems such as data-routers and super-computers is the requirement to transfer large amounts of data between ICs—either on the same circuit board or between boards. This data transmission application is called Serialisation-Deserialisation or "SerDes" for short. The present invention is useful in SerDes circuit and indeed was developed for that application. Nonetheless the invention may be used in other applications.

Analysis of typical backplane channel attenuation (which is around −24 dB) and package losses (−1 to −2 dB) in the presence of crosstalk predict that an un-equalized transceiver provides inadequate performance and that decision feedback equalization (DFE) is needed to achieve error rates of less than $10^{-17}$.

Traditional decision-feedback equalization (DFE) methods for SerDes receivers rely on either modifying, in analogue, the input signal based on the data history ["A 6.25 Gb/s Binary Adaptive DFE with First Post-Cursor tap Cancellation for Serial backplane Communications" R Payne et al *ISSCC* 2005; "A 6.4 Gb/s CMOS SerDes Core with feed-forward and Decision Feedback Equalization" M. Sorna et al *ISSCC* 2005; "A 4.8-6.4 Gb/s serial Link for Backplane Applications Using Decision Feedback Equalization" Balan et al *IEEE JSSC* November 2005.] or on having an adaptive analogue slicing level ["Techniques for High-Speed implementation of Non-linear cancellation" S. Kasturia *IEEE Journal on selected areas in Communications*. June 1991.] (i.e. the signal level at which the circuit decides whether the signal represents a 1 or a 0).

Figure 1:
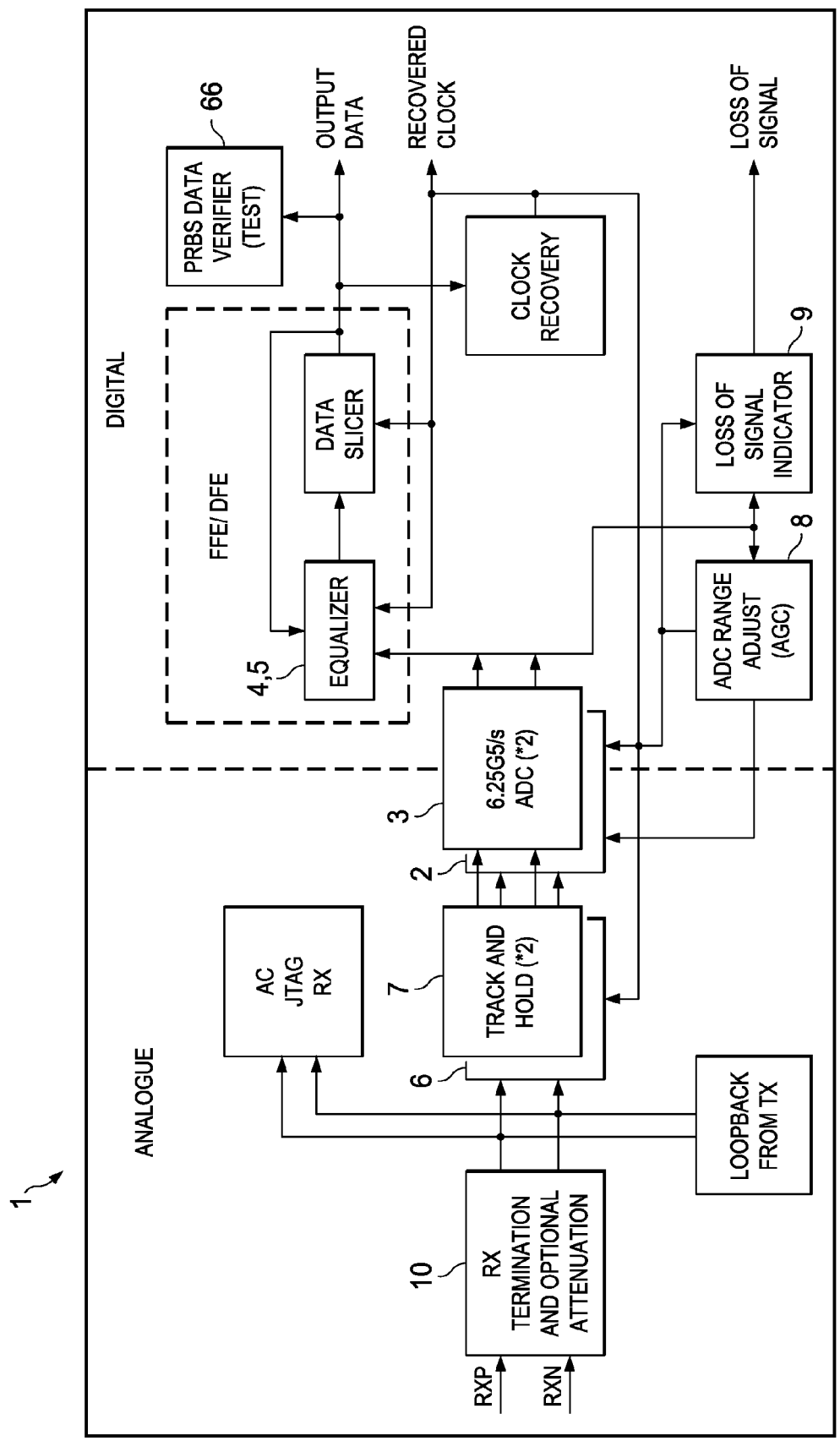
FIG. 1 is a block diagram of a receiver circuit, in which the invention may be used.

A block diagram of a SerDes receiver circuit 1, which forms part of an integrated circuit, in which the present invention may be used is shown in FIG. 1. The invention may nonetheless be used in other applications.

In the receiver circuit 1 of FIG. 1 the input data is sampled at the baud-rate, digitized and the equalization and clock & data recovery (CDR) performed using numerical digital processing techniques. This approach results in the superior power/area scaling with process of digital circuitry compared to that of analogue, simplifies production testing, allows straightforward integration of a feed-forward equalizer and provides a flexible design with a configurable number of filter taps in the decision feedback equaliser. The circuit has been implemented in 65 nm CMOS, operating at a rate of 12.5 Gb/s.

The receiver circuit 1 comprises two baud-rate sampling ADCs (analogue to digital converters) 2 and 3, a digital 2-tap FFE (feed forward equaliser) 4 and digital 5-tap DFE (decision feedback equaliser) 5 to correct channel impairments.

The SerDes section of the integrated circuit, which includes the receiver circuit 1 is also provided with a transmitter 40 (FIG. 4), connected to transmit data over a parallel channel to that which the receiver circuit 1 is connected to receive data. The transmitter 40 comprises a 4-tap finite impulse response (FIR) filter to pre-compensate for channel impairments. In many applications the integrated circuit transmitting data to the receiver circuit 1 uses pre-compensation and in particular a similar transmitter circuit 40, but in other applications the receiver circuit 1 works without pre-compensation being used at the other end.

The receiver 1 of FIG. 1 is now described in more detail. The received data is digitized at the baud-rate, typically 1.0 to 12.5 Gb/s, using a pair of interleaved track and hold stages (T/H) 6 and 7 and a respective pair of 23 level (4.5 bit) full-flash ADCs 2 and 3 (i.e. they sample and convert alternate bits of the received analogue data waveform). The two track & hold circuits enable interleaving of the half-rate ADCs and reduce signal related aperture timing errors. The two ADCs, each running at 6.25 Gb/s for 12.5 Gb/s incoming data rate provide baud-rate quantization of the received data. The ADC's dynamic range is normalized to the full input amplitude using a 7-bit automatic gain control (AGC) circuit 8. A loss of signal indication is provided by loss of signal unit 9 that detects when the gain control signal provided by the AGC is out-of-range. An optional attenuator is included in the termination block 10, which receives the signals from the transmission channel, to enable reception of large signals whilst minimizing signal overload.

Figure 2:
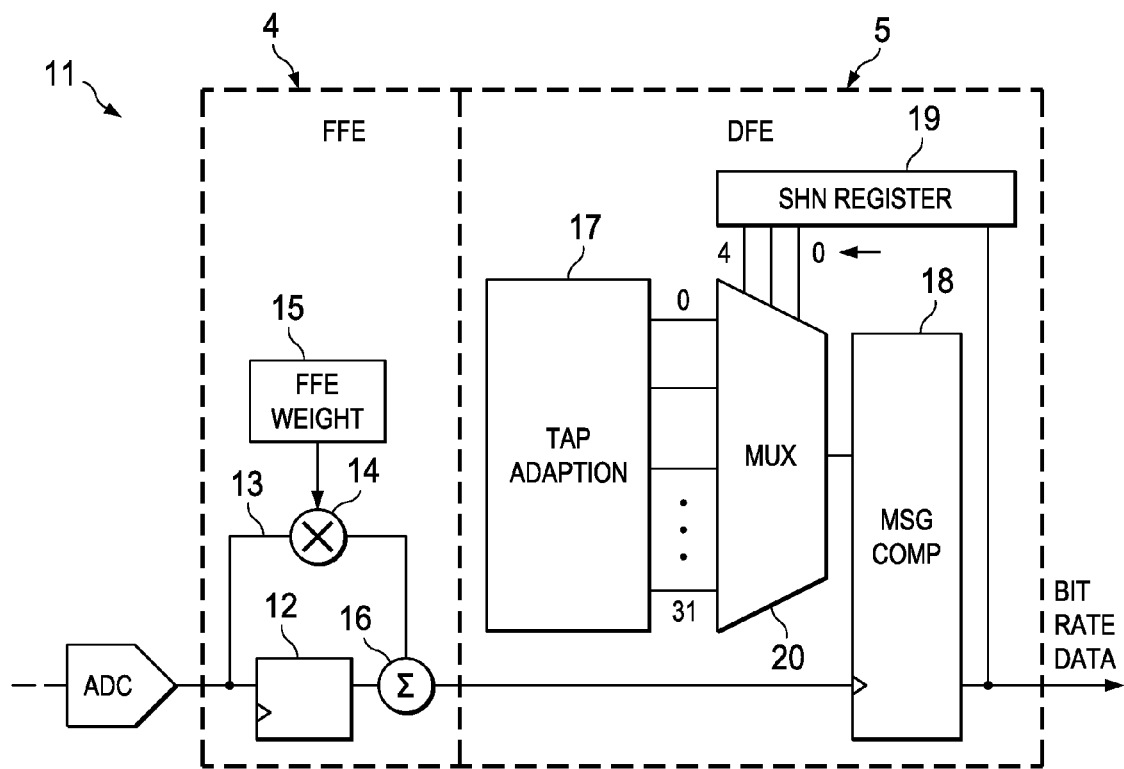
FIG. 2 shows the feed forward equaliser and the decision feedback equaliser of the receiver circuit of FIG. 1.

The digital samples output from the ADCs 2 and 3 are interleaved and the resulting stream of samples is fed into a custom digital signal processing (DSP) data-path that performs the numerical feed-forward equalization and decision-feedback equalization. This is shown in FIG. 2. This comprises a 1 UI delay register 12 connected to receive the stream of samples from the ADCs 2 and 3. (1 UI is a period of the clock, i.e. the delay between bits.) A tap 13 also feeds the samples from the ADCs to a multiplier 14, each sample being received by the delay latch 12 and the multiplier 14 at the same time. The multiplier 14 multiplies each sample by a constant weight value (held in a programmable register 15), which value is typically 10%. The outputs of the multiplier 14 and the delay register 12 are added together by an adder 16 to provide the output of the FFE 4.

The digital FFE/DFE is implemented using standard 65 nm library gates.

An advantage of applying the equalization digitally is that it is straightforward to include feed-forward equalization as a delay-and-add function without any noise-sensitive analogue delay elements. The FFE tap weight is selected before use to compensate for precursor inter-symbol interference (ISI) and can be bypassed to reduce latency. Whilst many standards require pre-cursor de-emphasis at the transmitter, inclusion at the receiver allows improved bit error rate (BER) performance with existing legacy transmitters.

The DFE 5 uses an unrolled non-linear cancellation method ["Techniques for High-Speed implementation of Non-linear cancellation" S. Kasturia *IEEE Journal on selected areas in Communications*. June 1991]. The data output (i.e. the 1s and 0s originally transmitted) is the result of a magnitude comparison between the output of the FFE 4 and a slicer-level dynamically selected from a set stored in a set 17 of pre-programmed registers. The values are determined by a control circuit (not shown in FIG. 1) from the waveforms of test patterns sent during a setup phase of operation. The magnitude comparison is performed by a magnitude comparator 18 connected to receive the output of the FFE 4 and the selected slicer-level; it outputs a 1 if the former is higher than the latter and a 0 if it is lower or equal, thereby forming the output of the DFE 5.

The slicer-level is selected from one of 2n possible options depending on the previous n bits of data history. The history of the bits produced by the magnitude comparator 18 is recorded by a shift register 19 which is connected to shift them in. The parallel output of the shift register is connected to the select input of a multiplexer 20 whose data inputs are connected to the outputs of respective ones of the set 17 of registers holding the possible slicer-levels.

Unrolled tap adaption is performed using a least mean square (LMS) method where the optimum slicing level is defined to be the average of the two possible symbol amplitudes (+1−1) when proceeded by identical history bits. (For symmetry the symbols on the channel for the bit values 1 and 0 are given the values +1 and −1).

Although 5-taps of DFE were chosen for this implementation, this parameter is easily scaleable and performance can be traded-off against power consumption and die area. In addition, the digital equalizer is testable using standard ATPG (automatic test pattern generation) and circular built-in-self-test approaches.

Figure 3:
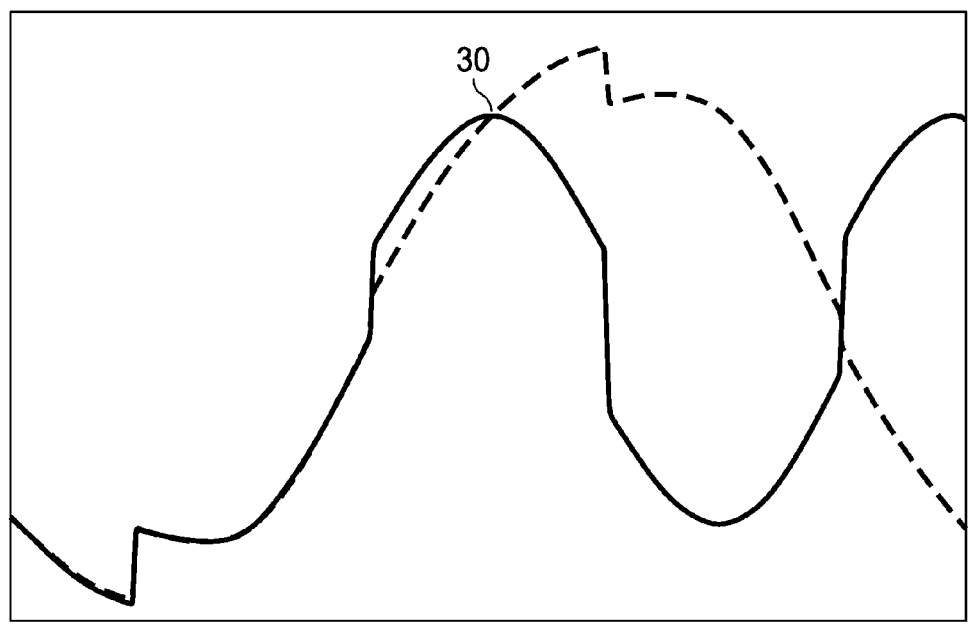
FIG. 3 is a graph showing the post equalised signal amplitude for exemplary bit patterns.

The chosen clock recovery approach uses a Muller-Mueller approach ["Timing recovery in Digital Synchronous Data Receivers" Mueller and Muller *IEEE Transactions on Communications* May 1976.] where the timing function adapts the T/H sample position to the point where the calculated pre-cursor inter-symbol interference (ISI) or h(−1) is zero, an example being given in FIG. 3. The two curves show the post-equalized response for 010 and 011 data sequences respectively. The intersection 30 at 3440 ps occurs when the sample of the second bit is independent of the third bit—that is, h(−1)=0. This position can be detected by comparing the post-equalized symbol amplitude with the theoretical amplitude h(0) and using the difference to update the CDR's phase-interpolator.

Figure 4:
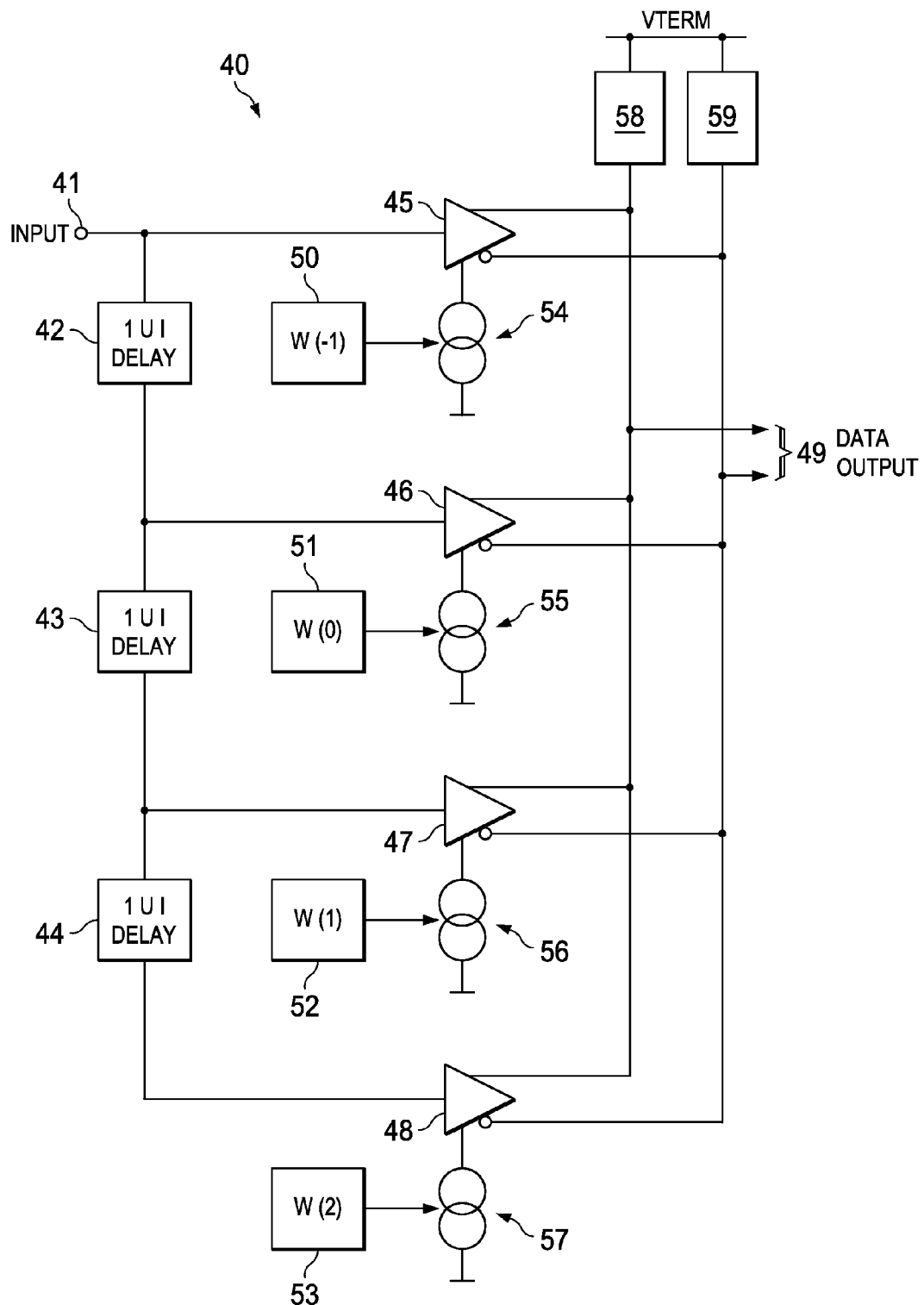
FIG. 4 is a diagram of a transmitter, in which the invention may be used.

A block diagram of the transmitter is shown in FIG. 4, which is implemented using CML techniques. The data to be transmitted (received at terminal 41) is sequentially delayed by three 1 UI delay registers 42, 43 and 44 connected in series. They produce, via the four taps before and after each delay, a nibble-wide word containing the pre-cursor, cursor and two post-cursor components. In fact to ease timing closure the data is sent to the transmitter from the digital part of the circuit that supplies the data in blocks of 4 nibbles (16 bits in parallel), the blocks being sent at a rate of 3.125/s. Each nibble is a frame of four bits of the bitstream offset by one bit from the next so the nibbles overlap and represent the data redundantly. A multiplexer then selects one of the nibbles, switching between them at a rate of $12.5 \times 10^9$/s, and presents that in parallel to the four taps, thereby making the bitstream appear to advance along the taps.

A 4-tap FIR output waveform is obtained from simple current summing of the time-delayed contributions. This is done with differential amplifiers 45 to 48, each having its inputs connected to a respective one of the taps and having its differential output connected to a common differential output 49. Although shown as four differential amplifiers the circuit is implemented as one differential amplifier with four inputs, which minimizes return-loss. The relative amplitude of each contribution is weighted to allow the FIR coefficients to be optimized for a given circuit (e.g. a backplane) and minimize the overall residual ISI. The weights are determined empirically either for a typical example of a particular backplane or once a backplane is populated and are stored in registers 50 to 53. The weights respectively control the controllable driving current sources 54 to 57 of the differential amplifiers 45 to 48 to scale their output current accordingly. Respective pull-up resistors 58 and 59 are connected to the two terminals of the differential output 49.

A phase-locked loop (PLL) is used to generate low-jitter reference clocks for the transmitter and receiver to meet standardsflOIF-CEI-02.0—Common Electrical I/O (CEI)—Electrical and Jitter Interoperability agreements for 6G+ bps and 11G+ bps I/O". Optical Internetworking Forum, February 2005; "IEEE Draft 802.3ap/Draft 3.0—Amendment: Electrical Ethernet Operation over Electrical Backplanes" IEEE July 2006.]. Most integrated circuits will have more than one receiver 1 and the PLL is shared between them with each receiver having a phase interpolator to set the phase to that of incoming data.

The PLL uses a ring oscillator to produce four clock-phases at a quarter of the line data-rate. The lower speed clocks allow power efficient clock distribution using CMOS logic levels, but need duty-cycle and quadrature correction at the point of use. The 3.125 GHz clocks are frequency doubled (XOR function) to provide the 6.25 GHz clock for the T/H & ADC. The transmitter uses the four separate 3.125 GHz phases, but they require accurate alignment to meet jitter specifications of 0.15UI p-p R.J. and 0.15U1 p-p D.J.

The system described has been fabricated using a 65 nm CMOS process and has been shown to provide error-free operation at 12.5 Gb/s over short channels (two 11 mm package traces, 30 cm low-loss PCB and two connectors). A legacy channel with −24 dB of attenuation at 3.75 GHz supports error free operation at 7.5 Gb/s.

Figure 5A:
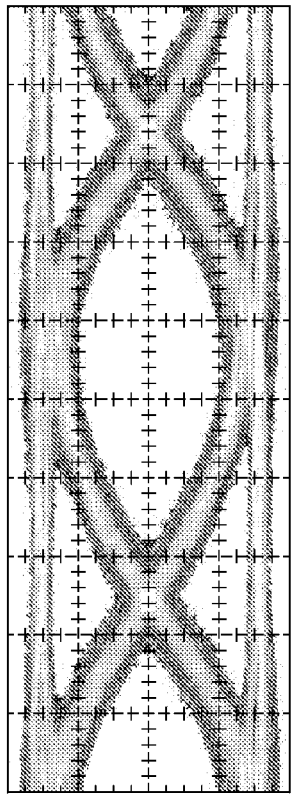
FIG. 5a shows the response of the receiver to a PRBS transmitted eye-pattern.
Figure 5B:
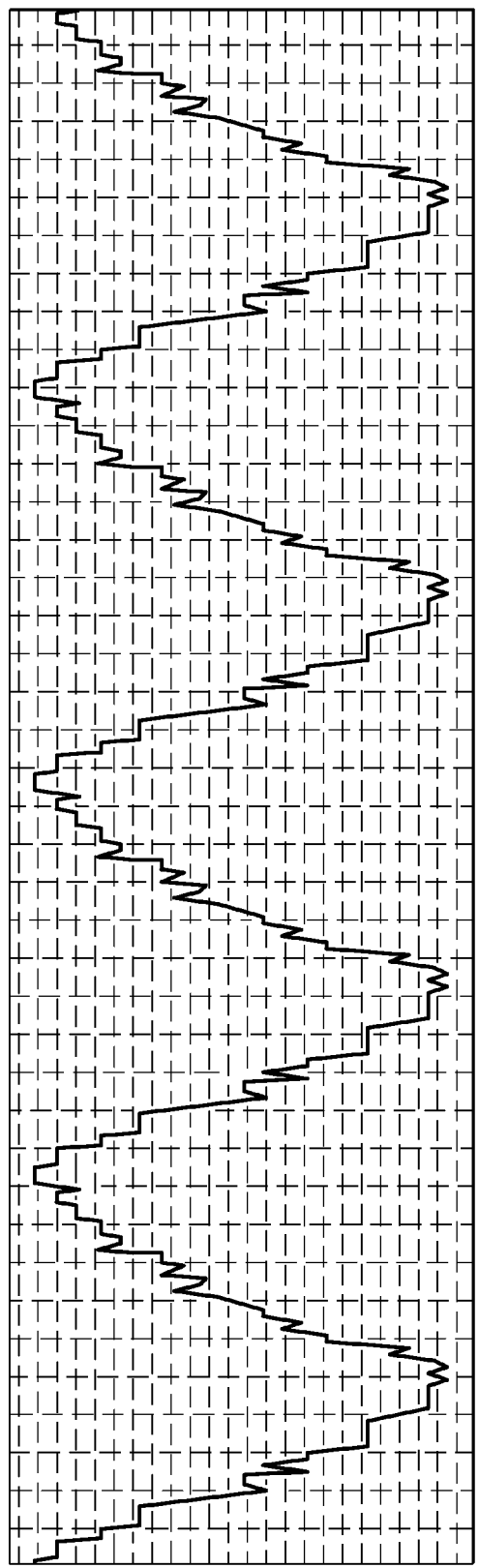
FIG. 5b shows the interleaved output of the ADCs of the receiver.

FIG. 5a shows a 12.5 Gb/s 27-1 pseudo random bit stream (PRBS) transmitted eye-pattern with 20% de-emphasis on the first post-cursor. The receiver includes, for test purposes, a PRBS data verifier 66, which confirms that the test pattern has been received. The differential peak-to-peak (pp) amplitude is 700 mV (200 mV/div). FIG. 5b shows the ADC output when a 6.25 GHz sine-wave is sampled and the phase between the sine-wave and receiver is incremented using a programmable delay-line. The measured codes are within +/−1 lsb (least significant bit) of the expected values. This level of performance ensures robust operation over a wide range of cables, green-field and legacy channels. The worst-case power of a single TX/RX pair, or "lane" is 330 mW and the total exemplary macro area is 0.45 mm$^2$ per lane (allowing for the PLL being shared by four TX/RX lanes.

Figure 6:
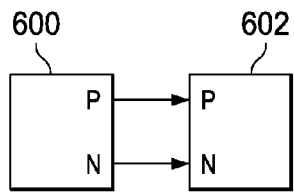
FIG. 6 shows a first exemplary interface between a transmitter and a receiver.

FIG. 6 is a block diagram showing an exemplary interface between a transmitter 600 and a receiver 602. The transmitter 600 has a differential output having a positive output P and a negative output N. The receiver 602 has a differential input having a positive input P and a negative input N. In the arrangement of FIG. 6, the positive output of the transmitter 600 is connected to the positive input of the receiver 602 and the negative output of the transmitter 600 is connected to the negative input of the receiver 602.

Figure 7:
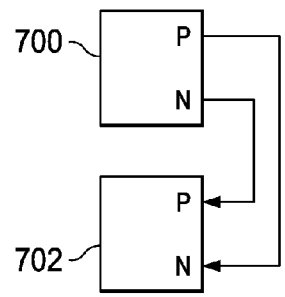
FIG. 7 shows a second exemplary interface between a transmitter and a receiver.

FIG. 7 is a block diagram showing an exemplary interface between a transmitter 700 and a receiver 702. The transmitter 700 has a differential output having a positive output P that is connected to a negative input N of the receiver 702 and a negative output N that is connected to the positive output P of the receiver 702. The wiring arrangement of FIG. 7 is referred to a wiring cross-over.

A wiring cross-over of the form shown in FIG. 7 results in an inversion of the sign of the sample transmitted. Thus, the transmission of a data having a value −6 is received as +6.

Figure 8:
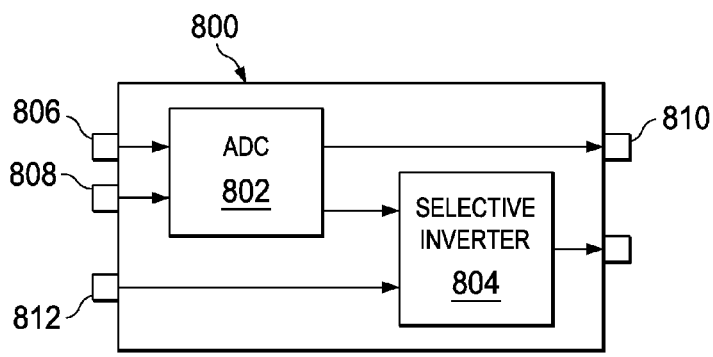
FIG. 8 shows the input stage of a receiver in accordance with an aspect of the present invention.

FIG. 8 is a block diagram of a circuit 800 that addresses the problem identified above.

The circuit 800 comprises an ADC 802 and a selective inverter 804. The ADC receives a differential input signal across input terminals 806 and 808 and outputs a parallel data word to output terminal 810 and a sign bit to the input of selective inverter 804. The selective inverter 804 has a second input that receives a sign select input from input terminal 812.

The sign select input indicates whether or not a wiring cross-over has occurred. In the event that a wiring cross-over has occurred, the sign bit will be incorrect; in that event, the sign bit received by the selective inverter 804 is simply inverted under the control over the sign select input. If a wiring cross-over has not occurred, the sign bit will be correct and so the selective inverter 804 does not invert the sign bit.

In this manner, the circuit 800 compensates for the problem of sign inversion caused by wiring cross-over by performing a sign inversion at the receiver. In one embodiment of the invention, the selective inverter 804 is an XOR-gate.

Figure 9:
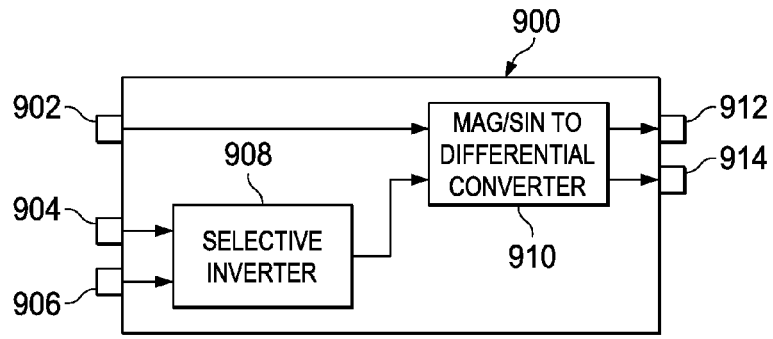
FIG. 9 shows the output stage of a transmitter in accordance with an aspect of the present invention.

In an alternative form of the invention, the selective inversion is carried out at the transmitter. A suitable transmitter 900 is shown in FIG. 9.

The transmitter 900 comprises first 902, second 904 and third 906 input terminals, a selective inverter 908, a magnitude/sign to differential converter 910 and first 912 and second 914 output terminals. The first 902 and second 904 input terminals receive data for transmission by the transmitter 900. The first terminal 902 receives a multi-bit word indicating the magnitude of the data for transmission and the second terminal 904 receives a data bit indicating the sign of the data word for transmission. The third input terminal 906 receives a control signal indicating whether or not the connection between the transmitter 900 and the receiver with which it is to be used includes a wiring cross-over.

The second 904 and third 906 input terminals are connected to first and second inputs of the selective inverter 908. The selective inverter inverts the sign bit obtained from the second input terminal 904 if the signal on the third input terminal 906 indicates that a wiring cross-over is present. In one form of the invention, the selective inverter 908 is an XOR gate.

The magnitude/sign to differential converter 910 has a first input connected to the first input terminal 902 and a second input connected to the output of the selective inverter 908. The converter 910 converts the magnitude and sign data at its inputs into a differential output signal. The differential outputs of the converter 910 are connected to the first 912 and second 914 output terminals of the transmitter 900.

In the event that there is no wiring cross-over, the magnitude and sign data received at the input terminals 902, 904 and 906 is passed directly to the magnitude/sign converter 910, which converter converts that data into a differential data output in a manner well known in the art. In the event that a wiring cross-over is present, the sign data is inverted before being received at the magnitude/sign converter 910. Thus, the inversion that is caused by the wiring cross-over is cancelled out by an inversion introduced in the transmitter.

The transmitter 900 can be used with a receiver that does not have the selective inversion capability described above with reference to FIG. 8, thereby providing backward compatibility.

In an exemplary implementation of the present invention, the data for transmission is quantized into one of thirteen different levels (−6, −5, −4 . . . 0 . . . 4, 5, 6) and sent at a rate of 12 GHz to a receiver. At the receiver, the signal and its inverse are applied to an ADC. As discussed elsewhere in this document, the slicing of the incoming data in such an arrangement into the correct quantum is not trivial and much correction and channel equalization may be required. A typical ADC output may be in the form of a thermometer code.

In many applications, it is desirable to convert from a thermometer code to a gray code. A receiver 1000 that carries out such a conversion is shown in FIG. 10.

The receiver 1000 comprises an ADC 1002, thermometer code-gray code converter 1004, gray code-magnitude and sign converter 1006 and a selective inverter circuit 1008. The magnitude output of the converter 1006 and the output of the selective inverter 1008 are the outputs of the receiver 1000, which outputs are provided to the equalizer and clock recovery systems of the SerDes circuit in which the receiver can be used.

ADC 1002 receives a differential input signal from the input of the receiver 1000 and outputs a 13-bit thermometer code to thermometer code-gray code converter 1004. Thermometer code-gray code converter 1004 converts the thermometer code to a 3-bit binary magnitude signal and a sign bit. The sign bit is provided as an input to selective inverter 1008, the other input of which is a sign select input to the circuit 1000. In the event that a wiring cross-over has occurred, the sign bit will be incorrect; in that event, the sign bit received by the selective inverter 1008 is simply inverted under the control over the sign select input. If a wiring cross-over has not occurred, the sign bit will be correct and so the selective inverter 1008 does not invert the sign bit.

Figure 10:
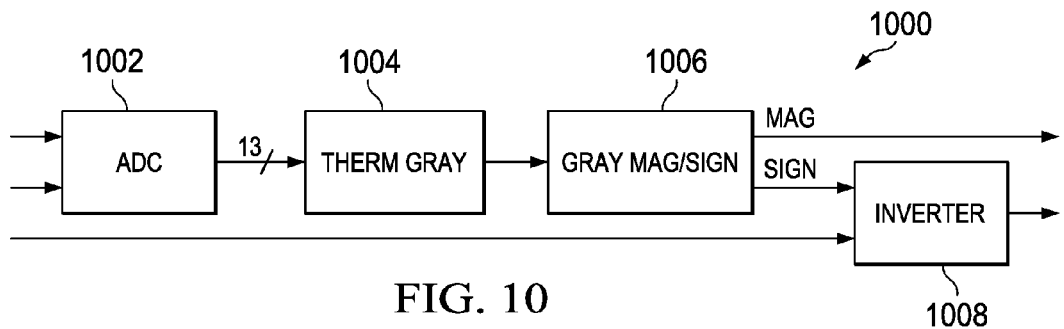
FIG. 10 shows a variant of the input stage of a receiver of FIG. 8.

Thus, the arrangement of FIG. 10 compensates for the problem of sign inversion caused by wiring cross-over by performing a sign inversion at the receiver.

In the present invention, it has been found that the logic required to recode the magnitude portion of the data output can introduce significant delay into the signal. This delay can be longer than the time required to recode the sign path. For this reason, dummy delay or redundant gates are typically placed in the sign path such that the data output is correctly aligned. When the sign selection of the present invention is applied, the necessary inversion may be achieved in place of one or more of the redundant gates. Thus, the present invention does not introduce any further delay in the signal processing and therefore represents a simple, elegant solution to the problem of cross-over wiring, without introducing further time delays into the data signals.

The receiver circuit of the present invention may form part of a macro in a much larger Application Specific Integrated Circuit (ASIC). In this and other situations, the sign select signal may be provided as a selection option, along with other macro configuration information. For example, such selections may be applied to a particular device by fuse selection during manufacture.

What is claimed is:

1. A receiver circuit comprising:
   a differential data input;
   a sign select input;
   an analogue-digital converter having inputs coupled to said differential data input and having first and second outputs, wherein said analogue-to-digital converter is adapted to convert a differential data signal received at said differential data input into a digital data output at said first output and a sign signal at said second output; and
   a selective sign inverter having a first input coupled to the sign output of said analogue-to-digital converter, a second input coupled to said sign select input and an output, wherein said selective sign inverter is adapted to provide a modified sign select signal at said output, wherein the signal received at the first input of said selective sign inverter is selectively inverted in dependence on the signal received at said second input in order to provide said modified sign select signal.

2. The receiver as claimed in claim 1, wherein said selective sign inverter is an XOR gate.

3. The receiver as claimed in claim 1, wherein said digital data output is in the form of a thermometer code.

4. The receiver as claimed in claim 3, further comprising a thermometer code to gray code converter for converting said digital data output into a gray code output.

5. The receiver as claimed in claim 1, wherein said receiver is a serialiser/seserialiser (SerDes) receiver.

6. A transmitter-receiver pair comprising:
a transmitter having a differential data output and a sign select output; and
a receiver comprising a differential data input;
a sign select input;
an analogue-digital converter having inputs coupled to said differential data input and having first and second outputs, wherein said analogue-to-digital converter is adapted to convert a differential data signal received at said differential data input into a digital data output at said first output and a sign signal at said second output; and
a selective sign inverter having a first input coupled to the sign output of said analogue-to-digital converter, a second input coupled to said sign select input and an output, wherein said selective sign inverter is adapted to provide a modified sign select signal at said output, wherein the signal received at the first input of said selective sign inverter is selectively inverted in dependence on the signal received at said second input in order to provide said modified sign select signal,
wherein the differential data output of said transmitter is coupled to the differential data input of said receiver and the sign select output of said transmitter is coupled to the sign select input of said receiver.

7. A transmitter circuit comprising:
a data input comprising a magnitude data input and a sign data input;
a sign select input;
a sign selective inverter having a first input coupled to the sign data input, a second input coupled to the sign select input and an output, wherein said selective sign inverter is adapted to provide a modified sign select signal at said output, wherein the signal received at the first input of said selective inverter is selectively inverted in dependence on the signal received at said second input in order to provide said modified sign select signal;
a magnitude/sign to differential converter having a first input coupled to the magnitude data input, a second input coupled to an output of the selective inverter and an output, wherein said magnitude/sign to differential converter is adapted to convert the magnitude data input and the modified sign select data into a differential data signal and to provide said differential data signal at said output; and
a differential output coupled to the output of said magnitude/sign to differential converter.

8. A transmitter-receiver pair comprising a transmitter as claimed in claim 7 and further comprising a receiver having a differential data input and an analogue-digital converter adapted to convert a different data signal received at said differential data input into a digital data input and a sign signal.

9. A method comprising the steps of:
receiving a differential data signal at a first input;
receiving a sign select input;
converting said differential data signal into a magnitude signal and a sign signal;
selectively inverting said sign signal in dependence on the sign select input and providing a selectively inverted signal as a sign output; and
outputting said magnitude signal and said sign output,
wherein selectively inverting said sign signal is achieved with at least one redundant gate.

10. A method comprising the steps of:
receiving a data input comprising a magnitude data input and a sign data input;
receiving a sign select input;
selectively inverting said sign data input in dependence on the sign select input and providing said selectively inverted signal as a sign input to a magnitude/sign to differential converter;
providing said magnitude data to said magnitude/sign to differential converter; and
generating a differential output from said magnitude data and a selectively inverted signal,
wherein selectively inverting said sign signal is achieved with at least one redundant gate.

* * * * *